United States Patent [19]

Awalt, Jr.

[11] 4,059,969
[45] Nov. 29, 1977

[54] AIR CONDITIONED SHELTER

[76] Inventor: Thomas Y. Awalt, Jr., 804 Poinciana Drive, Gulf Breeze, Fla. 32561

[21] Appl. No.: 636,675

[22] Filed: Dec. 1, 1975

Related U.S. Application Data

[63] Continuation-in-part of Ser. No. 487,721, July 1, 1974, abandoned, and Ser. No. 540,866, Jan. 14, 1975.

[51] Int. Cl.² ............................................ F25B 27/02
[52] U.S. Cl. .................................... 62/238; 62/115; 122/26; 237/2 B; 415/2
[58] Field of Search ................................ 415/2–4; 417/334; 290/44, 55; 62/115, 236, 467, 430, 238; 237/2 B; 122/26

[56] References Cited

U.S. PATENT DOCUMENTS

| 181,293 | 8/1876 | Wallace | 415/4 |
| 772,786 | 10/1904 | Clifford | 415/2 |
| 964,374 | 7/1910 | Bey | 415/3 |
| 1,031,489 | 7/1912 | Thomson | 122/26 |
| 1,112,203 | 9/1914 | Fandrey | 415/2 |
| 1,503,061 | 7/1924 | Pendergast | 415/4 X |
| 1,595,578 | 8/1926 | Sovereign | 415/2 X |
| 2,307,380 | 1/1943 | Baker | 62/238 X |
| 2,539,862 | 1/1951 | Rushing | 62/236 X |
| 2,652,699 | 9/1953 | Romani | 62/238 X |
| 2,860,493 | 11/1958 | Capps et al. | 62/238 |
| 3,752,395 | 8/1973 | Ashikian | 122/26 X |
| 3,806,733 | 4/1974 | Haanen | 290/55 |
| 3,942,026 | 3/1976 | Carter | 290/55 |
| 3,952,723 | 4/1976 | Browning | 122/26 X |
| 3,986,785 | 10/1976 | Ferencz | 415/2 |

FOREIGN PATENT DOCUMENTS

| 247,969 | 4/1927 | United Kingdom | 415/2 |

Primary Examiner—William E. Wayner
Assistant Examiner—William E. Tapolcai, Jr.

[57] ABSTRACT

A mechanically air conditioned shelter includes wind deflectors, as part of the outer walls of the shelter, and a series of blades moving about a generally vertical axis, the wind being funneled into working engagement with the blades. In a preferred embodiment, power from the blades is used to compress a fluid which is reversibly distributed to coils located outside of the shelter, and to another within a liquid storage tank, thereby to either heat or cool the liquid in the storage tank. This liquid is used for heating or cooling of the shelter. A sufficient volume of liquid is maintained in the storage tank to keep the shelter cooled or heated during those periods in which there is little or no wind.

19 Claims, 8 Drawing Figures

AIR CONDITIONED SHELTER

This is a continuation in part of my co-pending U.S. Pat. Applications Ser. No. 487,721, filed July 1, 1974, now abandoned and 540,866, filed Jan. 14, 1975, now pending.

BACKGROUND OF THE INVENTION

With energy declining and energy demands rising, the need for heating and cooling systems independent of central electrical power sources becomes ever-increasing. Heretofore, some success has been obtained with solar heat; but a major disadvantage in solar heating for shelters is that for the most part, demands for heat are heaviest when the supply of solar energy is at its natural ebb. Air pollution further restricts the use of solar heat for shelters. Cooling systems operating from solar heat collection sources are undeveloped.

Conversely, wind energy is ordinarily more abundant during periods of highest heat demand; it is not affected by atmospheric pollution; and it is more readily adapted to cooling as well as heating. Wind-powered heating and cooling systems of the past have been handicapped by a failure to economically and practically utilize available surface area to entrap and funnel the wind, thereby substantially increasing the amount of mechanical energy available. Moreover, problems in energy storage of wind-generated energy have not been solved. "Dumping" of energy has been necessary where wind was insufficient to turn generators at sufficient speeds and sometimes when winds were excessive. Functional integration of shelter, system, and wind has thus been lacking in attempts to heat and cool by use of wind power.

BRIEF DESCRIPTION OF THE INVENTION

Briefly, this invention comprises a walled shelter having, as an integral and functionally inter-related part thereof, fixed wind deflector means which include at least a substantial portion of the outer surface of the external walls of the shelter and so positioned as to funnel winds tangentially toward the arc described by the periphery of a plurality of blades which move radially about a generally vertical axis in such a manner that each blade presents a generally planar surface workably opposed to the force of the channeled wind. The blades may be track mounted or shaft mounted and the movement force is transmitted by mechanical means to a means for converting the mechanical energy to heat. The heat is then stored in any suitable medium and distributed, as required, for heating the shelter. The means for converting mechanical energy to heat may be a heat pump including at least one variable speed gas compressor. Fluid transfer means are provided between the gas compressor and a heat transfer means, preferably coils, preferably located in the first instance within or in conjunction with a heat storage means, preferably comprising a liquid storage space, and in the second instance outside of the shelter. The fluid transfer means is reversible so that the fluid may be evaporated in either of the heat transfer means and condensed in the other of the heat transfer means. A large volume of liquid in the liquid storage space is then used for storing the energy, smaller amounts being used for heating or cooling the shelter. For operation at ambient temperatures below that at which the heat pump is effective (at its present stage of development) a booster system is provided wherein the outside coil of a heat pump is heated supplementally by solar heat collected by sources common to or separate from the primary solar heat collecting system. This booster system may include heat storage means.

In the detailed description, reference will be made to the Drawing in which.

DEFINITIONS

By "mechanically air conditioned" is meant heated and cooled to a substantial part at least by energy which is not electrical or electrically transmitted.

By "generally horizontal" is meant within about 30° of horizontal, variations won which are not considered critical.

By "generally vertical" is meant within about 30° of vertical, variations on which are not considered critical.

By "generally tangential" is meant within about 30° of a prefect tangent variations on which are not considered critical.

By "generally planar" is meant having two dimensions and lying more or less on a plane, subject, however, to convexities or concavities and other distortions, variations on which are not considered critical.

DETAILED DESCRIPTION OF THE INVENTION

Figure 1A:
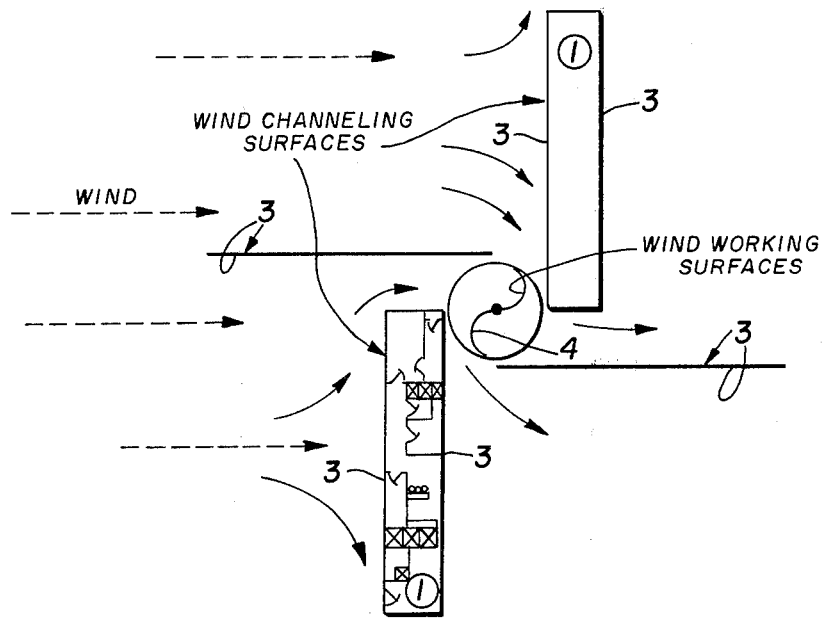
FIGS. 1A and 1B are schematic plan views of a preferred embodiment of this invention.
Figure 1B:
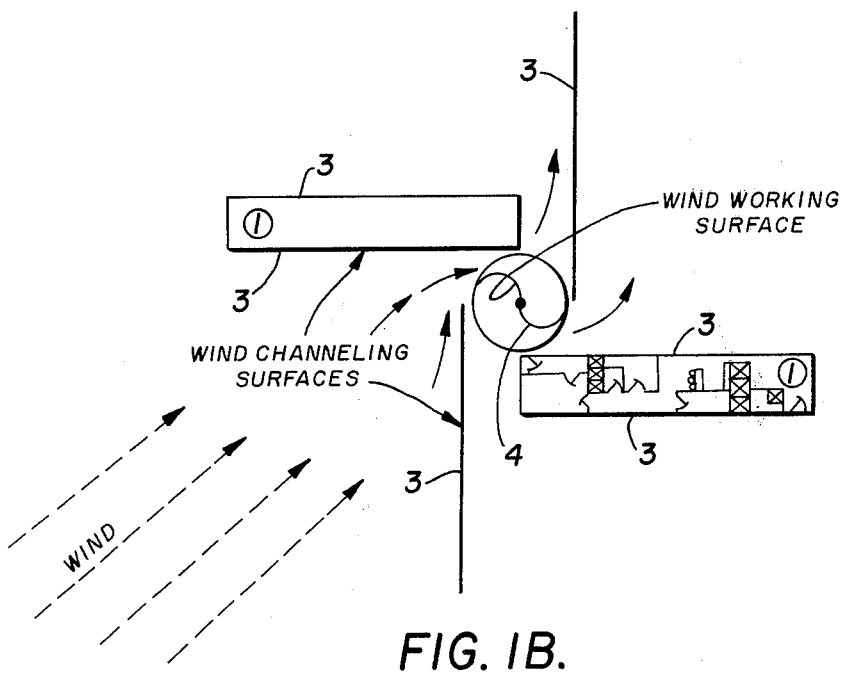

Referring now to FIG. 1A and 1B, shelters 1, are integral with two of the deflectors 3 and external of the arc described by the periphery of the blades. This permits blades 4 workably to engage the entire wind span from ground to structure top. As can be seen from the arrows generally depicting the force of the wind in each of two directions, the funneling system for the wind will be equally effective in almost any wind direction.

Figure 2:
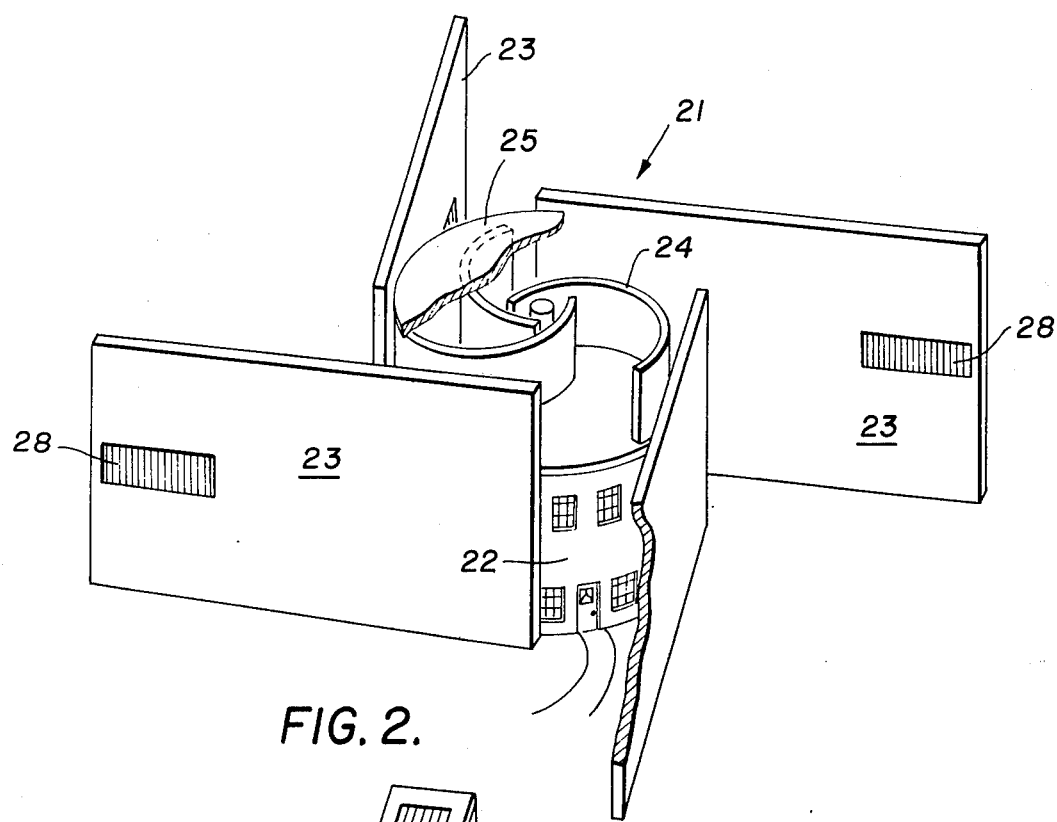
FIG. 2 is a perspective view of a second preferred embodiment of this invention.

Referring now to FIG. 2, shelter 21 is generally cylindrical but may be many sided, such as triangular, quandrangular, pentagonal, etc. Walls 22 of shelter 21 are a part of a system of fixed wind deflector means including planar surfaces 23, which in this embodiment are walls generally tangential to shelter walls 22. Blades 24 are positioned radially and permitted to rotate generally about a generally vertical axis not shown. Blades 24, for example, may be a track mounted or spoke mounted, such mountings not being shown. Superimposed upon blades 24 is optional cap 25 which is preferably essentially flat perforated or not as determined by its aerodynamic effect, and which holds blades in position relative to one another, and with blades 24 and a base (not shown but which is similar structurally), comprises a rotor which receives and engages the force of the wind. It will be observed that from any direction, wind will be funneled into working engagement with the blades.

Outside coils 28 are explained in connection with FIG. 6.

Figure 3:
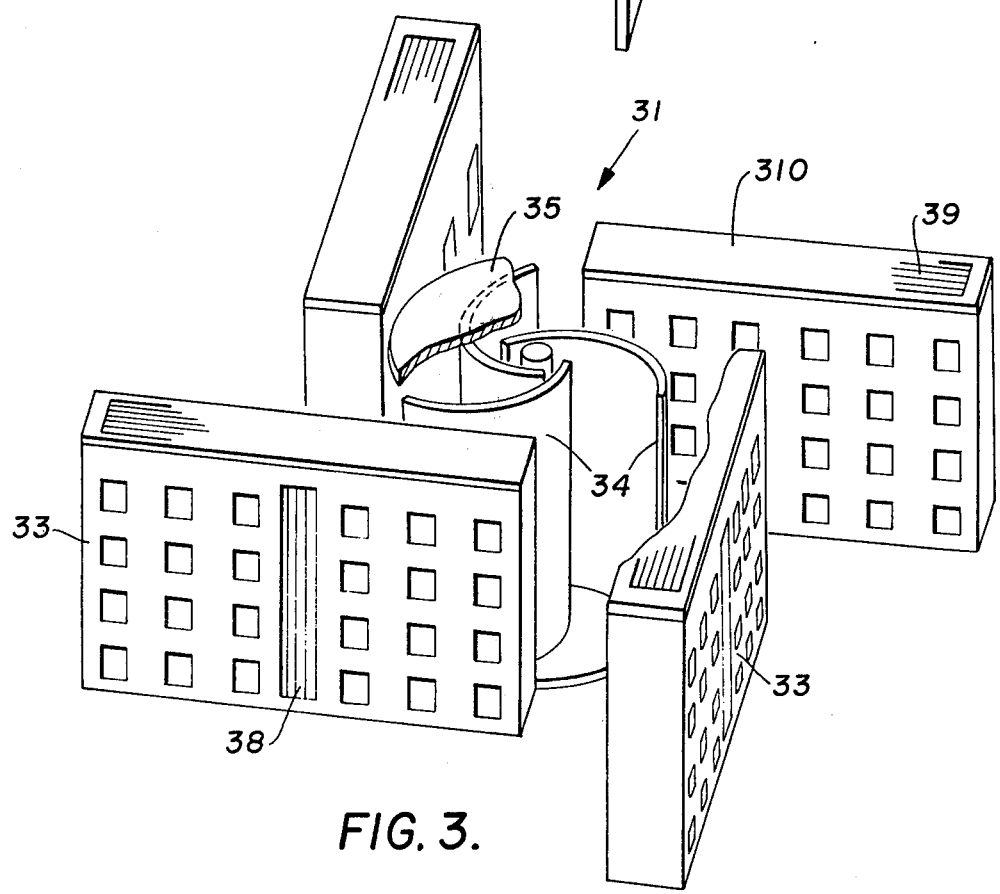
FIG. 3 is a perspective view of a third preferred embodiment of this invention.

In the embodiment of FIG. 3, wind deflector surfaces 33 are composed entirely of the external walls of separate units of shelter 31. Blades 34 are subjected to the enormous thrust of power of the wind which is channeled generally tangent to the arc described by the periphery of the blades workably to engage blades 34. Optional cap 35 is employed primarily for structural consideration, furnishing regidity to blades 34. Supplemental solar heat panels 39 may be superimposed on roof 310. Outside coils 38 are explained in connection with FIG. 6.

Figure 4:
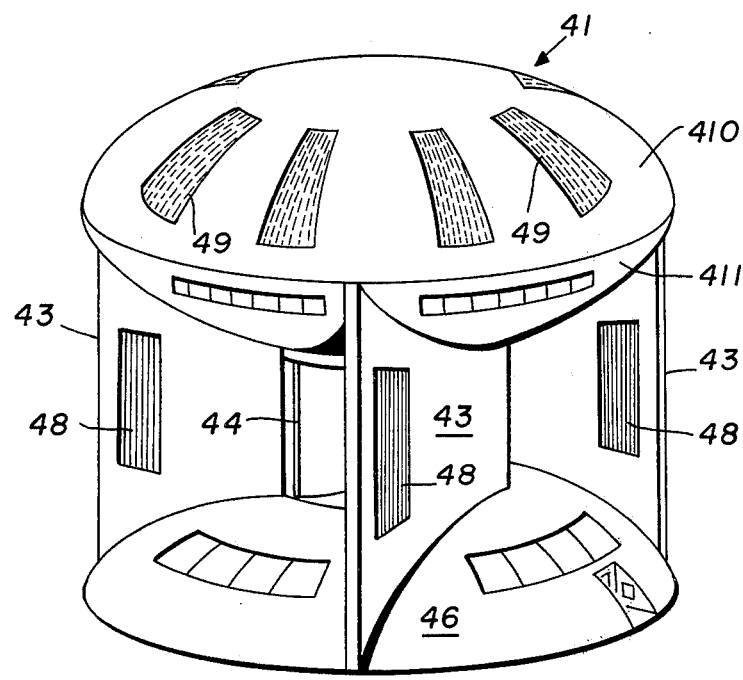
FIG. 4 is a perspective view of a fourth preferred embodiment of this invention.

Referring now to FIG. 4, shelter 41 defines living space included within wall 411 and roof 410 and within base 46. Wind deflector surfaces 43 may or may not include living space, or access between upper and lower portions of the living space. As is readily seen, wind is funneled by surfaces of 411 and 46 as well as general tangential surfaces 43 so as workably to engage blades 44. Outside coils 48 are explained in connection with FIG. 6. Optional solar heating panels 49 are superimposed on roof 410.

Figure 5:
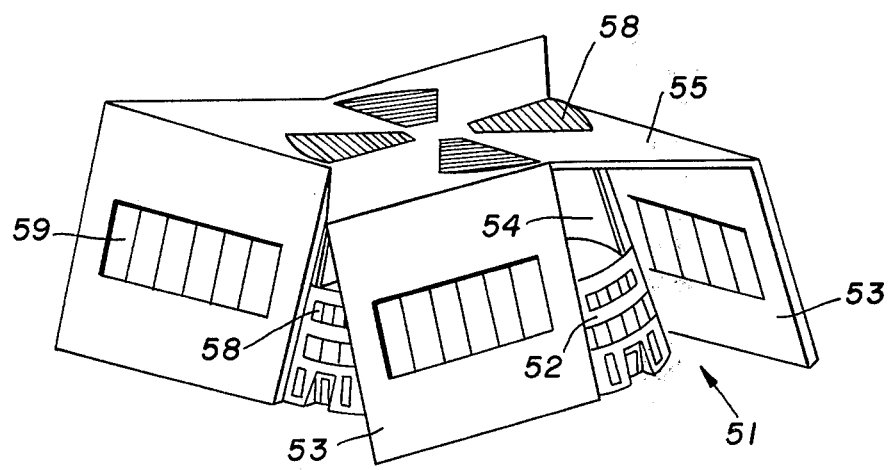
FIG. 5 is a perspective view of a fifth preferred embodiment of this invention.

Referring now to FIG. 5, shelter 51 is in the form of a truncated cone comprising inwardly disposed walls 52, generally tangential wind deflector surfaces 53 and cap 55. Again, surfaces 52, 53, and 55 funnel the wind from any direction generally tangential to blades 54 which are located between the living space and cap 55. This preferred embodiment easily permits the use of supplemental solar heat panels 58 along surfaces 52 as well as 53 or on cap 55 to the extent required by climatic conditions. Outside coils 59 are located on surfaces 53, but may be optionally located on or in cap 55 thus providing an upward exit for wind passing through the coils.

Figure 6:
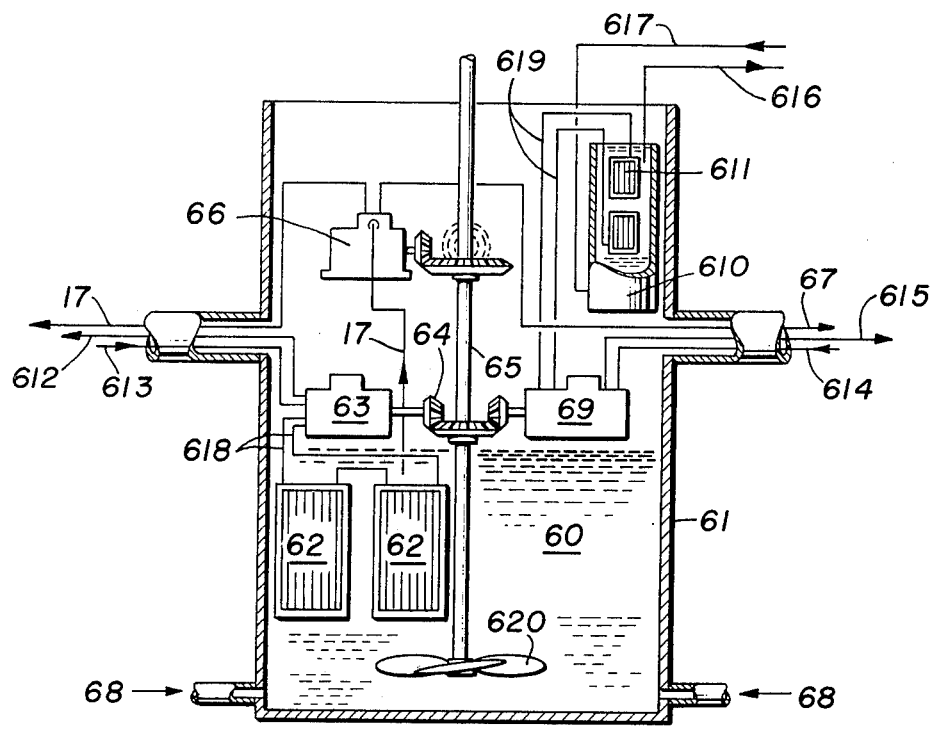
FIG. 6 is a schematic of a preferred heating and cooling system which constitutes a part of this invention.

Referring now to FIG. 6, a schematic is shown of a preferred utility core suitable for use within or adjacent the living space of the shelter of FIGS. 1, 4, or 5. A liquid 60 is maintained in the liquid energy storage 61. Submerged in liquid 60 are coils 62 which may be heated or cooled by operating as either condensor or evaporator in a reversible system in conjunction with compressor pump 63 via refrigerant fluid lines 618 and via refrigerant lines 612 and 613 with outside coils 28, 38, 48 and 58 (not shown). Compressor pump 63 operates mechanically from gear system 64 which is powered from the power shaft 65, the power shaft in turn being rotated by the force of the moving blades 24, 34, etc. (not shown). A heating water circulating pump 66 circulates liquid 60 from the liquid energy storage 61 via line 67 to the extent necessary throughout the living space of the shelter and returns the water through liquid return 68. Heating water circulating pump 66, as well as a second compressor pump 69 for water heat, is also propelled from power shaft 65. The water heat system is identical with that of the heating phase of the heating system, (comprising tank 610, coils 611 with refrigerant fluid lines 619, fluid lines 614 and 615 in conjunction with outside coils 28, etc.(not shown), and water delivery and return lines 616 and 617) and could be one and the same for cold weather operation. However, it is preferable to maintain a separate hot water system in order to permit the liquid energy storage unit to be cooled in the summer time without affecting the supply of hot water. Outside coils working in conjunction with each of the compressors and the internal coils are shown in FIGS. 2-5 as coils 28, 38, 48 and 58. Optional solar heating panels are shown in FIGS. 3-5 as solar heat panels 39, 49 and 59. Liquid 60 is agitated by impeller 620.

Figure 7:
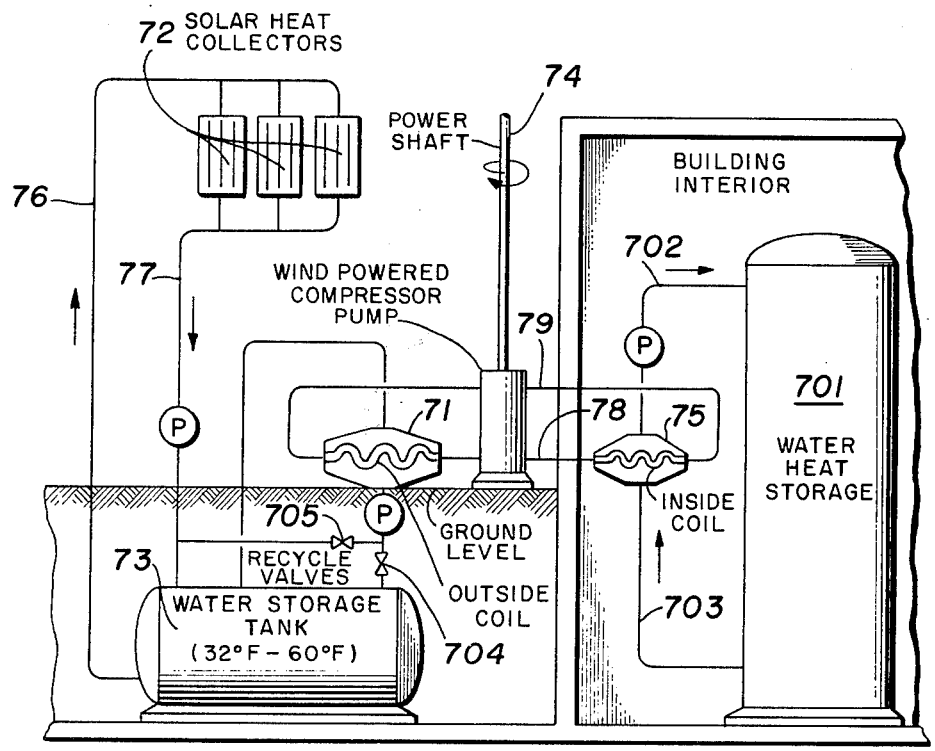
FIG. 7 is a schematic of a booster system for use with or as a part of this invention.

Referring to FIG. 7, outside coil 71, during cold weather operation, is heated by water warmed in solar heat collectors 72, transferred through liquid lines 76 and 77 and stored as appropriate, in water storage tank 73. During hot weather operation the water may be used to cool outside coil 71, heat collectors 72 being used at night to cool the water. As already explained power shaft 74 operates compressor pump 75, which, along with outside coil 71, inside coil 75 and refrigerant lines 78 and 79, comprise the heat pump of this embodiment. Heat or coolness is transferred from inside coil 75, to liquid energy storage unit 701 through liquid transfer lines 702 and 703. When the booster system is in operation (heating mode) recycle valves 704 and 705 permit circulation of freshly heated liquid direct from the booster solar heat collectors 72 when, during energy collecting weather, maximum heat is required.

An important feature of this invention is the structural and functional cooperation obtained by use of wind deflectors comprising a substantial portion of the outer surface of the external walls of the shelter thus permitting, in a system utilizing a minimally critical energy source, a proximate relationship between the energy collection source, the blades, the liquid storage space, and the living space. If the wind deflectors did not comprise such a substantial portion of the shelter walls, the walls of any close-by shelter would detract from, rather than complement, the useable force of the wind. If, on the other hand, the shelter were far removed from the blades, in this particular system, it would be necessary to undertake an impractical mechanical transfer of power over the distance or suffer the detrimental loss (or gain) of heat in transmission, depending upon location of the liquid storage space; and it is important that the liquid storage be close to the living space. Even if the all-around radiant energy effect of a preferred centrally located liquid storage space cannot be utilized, close proximity to the living space is nevertheless desirable and near close proximity is essential because of the high heat loss inherent in liquid transmission. Moreover, if the liquid storage is centrally located as in a utility core, heat loss is of no great importance because radiation or connection out of or into the utility core will tend toward a more comfortable living space. Removable insulation shielding may be provided to control such radiation or convection for greater comfort. If the liquid storage unit must be external to the shelter area, it must be well insulated or preferably buried under the frost line. Of course, the liquid storage space should be large enough to maintain an ample supply of hot liquid for the winter months and cool liquid for the summer months during periods without wind.

Wherever solar heat panels are referred to herein is meant panels whereby the heat of the sun is transmitted to small amounts of water which is subsequently collected and transferred to the liquid storage space as is well known in the art. It is recognized that in certain areas of the world, particularly in the colder regions, it may be necessary to supplement wind power within the meaning of this invention with solar power or electricity. It is also recognized that supplemental or auxiliary electrical power may also be desirable for general use in such a shelter, but it can be readily seen that with proper planning, any supplemental electrical power need should be minimal. Of course, one or more electrical generators may also operate from the blade power of this invention, but under normal circumstances, and with a ready availbility of small amounts of commercial electrical power for lighting, it would probably be more practical to utilize all wind power to satisfy the high energy needs of the shelter for heating and cooling, using commercially available electricity for lighting and light energy requirement appliances. One heavy energy requirement appliance which is not accounted for in the disclosure thus far, but which in conjunction with heating and cooling requirements account for most electrical energy used in most shelters at the present time, is the dryer. Clothes drying can, of course, be accomplished by employing a set of coils employed as a condensor in conjunction with one of the compressors shown in FIG. 6, preferably the water heat compressor in such a manner that the space inside a drum-like tumbler is heated. With the use of an air circulation device, clothes drying can thus be accomplished from energy obtained through wind power rather than electrical energy.

As implied above, a centrally located power shaft within an energy core is not an essential element of the generic concept of this invention. Energy may be transferred from the blades to the driven devices by means of circumferentially located gears or chains. Such power transfer means would be preferable with respect, for example, to the embodiment of FIG. 4 in which a portion of the living space may be internal of the blades.

Mechanical agitation of the water within the liquid energy storage unit is desirable albeit not essential. An agitator is provided in a schematic of FIG. 6.

The particular configuration of the blades, or their working or nonworking disposition is not considered to be an element of this invention. Accordingly, the term "radially disposed" means disposed generally along or about the radius but not necessarily co planar with the radius. Within the blade concept are many which are suitable and well known in the arts, including convoluted or concave blade surfaces facing the wind and presenting streamlined or convex surfaces toward the direction of movement. Savonious or "S" shaped blades have been found extremely effective in utilizing the added energy advantage of the deflector surfaces. Also within the concept are upwardly deflecting blades of a dish or straight plane variety which would be employed without a portion of optional cap 5. All that is required of the blades is that they present a generally planar surface workably opposed to at least one line of force extending along a generally tangential line from any point thereon to the point of departure of the tangential line from the arc described by the periphery of the blades. It is not necessary that the blades feather, nor is it required that they do not feather.

In a given design, of course, attention will be given to the areodynamic aspects of the particular configuration. Vacuums will be created on the sides of the deflecting surfaces away from the winds, and these vacuums will furnish ample outlet for the air being forced through the slots created by the wind deflectors, at least two of which are generally vertical and extend generally tangential to the arc described by the periphery of the blades upon rotation. This permits a functional design workable from the direction of the prevailing winds. Easily within this concept is a blade disposition which is not radial in the sense that blades are always equidistant from the axis. For example, the plan configuration of the shelters of FIG. 4 or 5 could well be oval rather than circular. Thus, blades may be disposed to present maximum working surface to prevailing winds. As used herein, the term "radial" or "radially" should be understood to include such concept. Also within the concept is a cap of various conventional roof shapes which would permit, for example a "peaked" cap rather than a perfectly horizontal planar cap.

In the system depicted by FIG. 6, coils submerged in the liquid storage are employed as heat transfer means. This is not necessary so long as the coils coact with the liquid for heat transfer. "Outside coils" are more comprehensively described as coils coacting with an external fluid medium which may or may not be the external atmosphere; or a combination of coils may be employed such as to transfer heat or coolness to or from the refrigerant to or from either or both liquid (from running water supply, swimming pool, storage tank, etc.) and the external atmosphere. An external liquid medium may be in conjunction with an outside booster system such as described in FIG. 7. The theory and various practical applications of the heat pump are well known in the art. Of course, atmospheric exposure to coils may be intensified by utilization of the funneled air created by the wind deflectors.

I claim:
1. The combination of a wind-harnessing energy collection system with a shelter having at least one exterior wall, the system comprising:
   1. A plurality of blades disposed generally about a generally vertical axis so that upon movement about said axis, at least one blade presents a generally planar surface workably opposed to at least one line of force extending along a generally tangential line from any point thereon to the point of departure of said tangential line from the arc described by the rotation of the periphery of the blades;
   2. Rotable mounting means for said blades whereby, rotation of said blades generally about said axis is permitted, and,
   3. Fixed wind deflector means including at least a portion of at least one exterior wall of the shelter and comprising a plurality of fixed generally planar surfaces at least two of which are generally vertical and extending generally tangential to said arc described by the periphery of said blades upon rotation thereby to funnel ambiant winds tangentially towards said arc so as workably to engage said blades.

2. The wind-harnessing energy collector system of Claim 1 wherein at least one blade presents a generally planar surface workably opposed to at least one line of force extending in a generally ascending direction.

3. The system of claim 1 wherein wind deflector means include at least one external wall of said shelter 50 disposed as to upwardly deflect wind towards said blades.

4. The system of claim 1 wherein wind deflector means include at least one external wall of said shelter so disposed as to downwardly deflect wind toward said blades.

5. The system of claim 1 wherein said generally vertical wind deflector means are slanted from the vertical so as to conform to an upwardly deflecting truncated generally cone-shaped surface comprising the outer surface of the external wall of said shelter, said upwardly deflecting outer surface and said slanted generally tangential planar surface coacting with said cap to create at least one three-sided funnel to channel the wind so as workably to engage said blades.

6. An air conditioning system for a shelter comprising in combination:
   a. means for converting mechanical energy to heat;
   b. b. means for storing heat;
   c. means for distributing to heat; and
   d. means for collecting the mechanical energy comprising;
      1. A plurality of blades disposed generally about a generally vertical axis so that upon movement about said axis, at least one blade presents a generally planer surface workably opposed to at least one line of force extending along a generally tangential line from any point thereon to the point of departure of said tangential line from the arc described by the rotation of the periphery of the blades.
      2. Rotable mounting means for said blades whereby rotation of said blades generally about a said axis is permitted.
      3. Fixed wind deflector means including at least a portion of at least one exterior wall of the shelter and comprising a plurality of fixed generally planer surfaces at least two of which are generally vertical and extending generally tangential to said arc described by the periphery of said blades upon rotation thereby to funnel ambiant winds tangentially towards said arc so as to workably engage said blades, and
      4. Mechanical power transfer means between the blades and the heat conversion means.

7. The system of claim 6 wherein the heat distribution means includes heat storage means.

8. The system of claim 6 wherein means for converting mechanical energy to heat includes means for converting mechanical energy to coolness, means for storing heat includes means for storing coolness, and means for distributing heat includes means for distributing coolness.

9. The system of claim 6 further including a cap affixed to the upper edges of the blades.

10. The system of claim 6 in which the blades upwardly deflect the wind.

11. A mechanically air conditioned shelter having external walls and a living space and comprising in combination:
   a. liquid energy storage including:
      1. liquid storage space, and
      2. liquid;
   b. a first heat transfer means coacting with said liquid;
   c. a variable speed gas compressor;
   d. a second heat transfer means coacting with a fluid medium external to said shelter and said storage space;
   e. fluid transfer means between each of said first and second heat transfer means and said compressor, whereby compressed fluid may be evaporated in either of said heat transfer means and condensed in the other of said heat transfer means;
   f. heat transfer and distribution means whereby heat is transferred to or from said storage space from or to said living space and distributed within said living space;
   g. a plurality of blades positioned radially and moveable about a generally vertical axis so that upon movement about said axis, each blade presents a generally vertical planar surface workably opposed to at least one line of force extending along a generally tangential line from any point thereon to the point of departure of said tangential line from the arc described by the rotation of the periphery of the blades;
   h. rotatable mounting means for said blades whereby rotation of said blades about said axis is permitted;
   i. mechanical power transfer means between said blades and said compressor, and
   j. fixed wind deflector means including at least a substantial portion of the outer surface of said external walls of said shelter and comprising a plurality of fixed generally planar surfaces at least two of which are generally vertical and extending generally tangential to said arc described by the periphery of said blades upon rotation thereby to funnel prevailing winds tangentially toward said arc so as workably to engage said blades.

12. The shelter of claim 11 further including a hot water system in which the hot water is heated by a fluid compression, evaporation, condensation, and transfer system having a compressor driven by the mechanical power generated by the wind working against the blades.

13. The shelter of claim 11 further including an agitator in the liquid storage space.

14. The shelter of claim 13 in which the agitator is powered by a drive shaft which in turn is gear driven by the blades.

15. The shelter of claim 11 wherein said heat transfer and distribution means comprises the radiant effect of at least a portion of the living space and at least a portion of the perophery of the liquid storage space in close proximity.

16. The shelter of claim 11 wherein said heat transfer and distribution means comprises liquid distribution, heat transfer and return means whereby said liquid is transferred to or from said storage space from or to said living space and heat is transferred to or from said liquid from or to the atmosphere of said shelter.

17. The shelter of claim 16 wherein the liquid distribution means includes a pump mechanically operated by wind power.

18. The shelter of claim 11 wherein the fluid medium external to the shelter comprises the ambiant atmosphere.

19. The shelter of claim 11 wherein the fluid medium external to the shelter comprises a liquid which is heated by solar heat collectors.

* * * * *